(12) United States Patent
Sousa et al.

(10) Patent No.: US 7,702,336 B2
(45) Date of Patent: *Apr. 20, 2010

(54) CHANNEL ASSIGNMENT BASED ON SPATIAL STRATEGIES IN A WIRELESS NETWORK USING ADAPTIVE ANTENNA ARRAYS

(75) Inventors: Elvino S. Sousa, Toronto (CA);
Athanasios A. Kasapi, San Francisco, CA (US); Mitchell D. Trott, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/467,132

(22) Filed: May 15, 2009

(65) Prior Publication Data
US 2009/0233614 A1    Sep. 17, 2009

Related U.S. Application Data

(63) Continuation of application No. 10/112,164, filed on Mar. 28, 2002, now Pat. No. 7,539,496.

(51) Int. Cl.
  H04W 72/00   (2006.01)
  H04W 4/00    (2006.01)
(52) U.S. Cl. .................. 455/450; 455/452.1; 455/452.2; 455/509; 455/464; 455/67.11; 370/329; 370/341; 370/328; 370/338; 370/310

(58) Field of Classification Search .................. 455/450, 455/452.1, 452.2, 434, 509, 464, 453, 422.1, 455/562.1, 575.7
See application file for complete search history.

(56) References Cited

U.S. PATENT DOCUMENTS

| 5,159,596 | A | 10/1992 | Itoh |
| 5,193,109 | A | 3/1993 | Chien-Yeh Lee |
| 5,293,641 | A | 3/1994 | Kallin et al. |
| 5,305,468 | A | 4/1994 | Bruckert et al. |
| 5,392,453 | A | 2/1995 | Gudmundson et al. |

(Continued)

*Primary Examiner*—Huy Phan
(74) *Attorney, Agent, or Firm*—Blakely, Sokoloff, Taylor & Zafman LLP

(57) ABSTRACT

Channels are assigned based on co-spatial constraints in wireless network using spatial division multiple access. In one example, the invention includes assigning a co-spatial constraint to each of a plurality of conventional traffic communications channels of a base station, and receiving a request from a user terminal to communicate using a traffic communication channel of the base station. The invention further includes measuring a quality parameter of the request deriving a co-spatial constraint for the user terminal, assigning the user terminal co-spatial constraint to the user terminal, and assigning the user terminal to a traffic communication channels having a channel co-spatial constraint that is no less than the user terminal co-spatial constraint and that has no more assigned radios than permitted by the channel co-spatial constraint.

19 Claims, 6 Drawing Sheets

U.S. PATENT DOCUMENTS

| | | | |
|---|---|---|---|
| 5,396,645 A | 3/1995 | Huff | |
| 5,504,776 A | 4/1996 | Yamaura et al. | |
| 5,669,062 A | 9/1997 | Olds et al. | |
| 5,745,854 A | 4/1998 | Schorman | |
| 5,822,698 A | 10/1998 | Tang et al. | |
| 5,886,988 A | 3/1999 | Yun et al. | |
| 5,909,649 A | 6/1999 | Saunders | |
| 5,937,353 A | 8/1999 | Fapojuwo | |
| 6,091,933 A | 7/2000 | Sherman et al. | |
| 6,144,851 A | 11/2000 | Qureshi | |
| 6,301,232 B1 | 10/2001 | Dutta | |
| 6,330,429 B1 | 12/2001 | He | |
| 6,337,853 B1 | 1/2002 | Piolini | |
| 6,370,128 B1 * | 4/2002 | Raitola | 370/329 |
| 6,411,612 B1 | 6/2002 | Halford et al. | |
| 6,415,163 B1 * | 7/2002 | Keskitalo et al. | 455/562.1 |
| 6,563,806 B1 | 5/2003 | Yano et al. | |
| 6,608,827 B1 | 8/2003 | Austin | |
| 6,760,594 B1 | 7/2004 | Murasawa et al. | |
| 6,775,547 B2 | 8/2004 | Zimmerman et al. | |
| 6,795,409 B1 | 9/2004 | Youssefmir et al. | |
| 7,047,016 B2 | 5/2006 | Walton et al. | |
| 7,136,645 B2 | 11/2006 | Hanson et al. | |
| 7,457,622 B2 | 11/2008 | Kayama et al | |
| 2001/0024428 A1 * | 9/2001 | Onouchi | 370/329 |
| 2001/0046882 A1 | 11/2001 | Karimi et al. | |
| 2002/0098873 A1 | 7/2002 | Alexiou | |
| 2002/0137519 A1 | 9/2002 | Miyoshi et al. | |
| 2002/0160781 A1 | 10/2002 | Bark et al. | |
| 2003/0158923 A1 | 8/2003 | Burkhart | |
| 2004/0095907 A1 | 5/2004 | Agee et al. | |
| 2004/0224692 A1 | 11/2004 | Hamabe | |

\* cited by examiner

CHANNEL ASSIGNMENT BASED ON SPATIAL STRATEGIES IN A WIRELESS NETWORK USING ADAPTIVE ANTENNA ARRAYS

The present application is a Continuation application claiming priority from U.S. patent application Ser. No. 10/112,164, filed on Mar. 28, 2002, entitled Channel Assignment Based on Spatial Strategies in a Wireless Network Using Adaptive Antenna Arrays.

BACKGROUND OF THE INVENTION

1. Field of the Invention

The present invention applies to the field of wireless communications systems using adaptive antenna arrays and, in particular, to allocating communications channels and terminals using spatial strategies in a spatial division multiplexed wireless communications system.

2. Description of the Prior Art

A typical wireless communications system is generally subdivided into cells. A cell is generally thought of as a distinct geographic area, although cells usually overlap in reality. A cell is generally associated with a base station providing service to user terminals that enter the cell, i.e., the base station's service area. Thus, a cell may also be thought of as a collection of remote terminals communicating with a particular base station at a certain time. Thus, while cells are pictured geographically, it is possible for two user terminals in close proximity to be in different cells, so long as they are communicating with different base stations of the wireless radio network.

Adaptive antenna arrays and SDMA (Spatial Division Multiple Access) enable a wireless system to use strategies to reduce interference and enhance system capacity. These strategies include 1) increasing the signal to interference ratio on the uplink (user terminal to base station) by adjusting received signal samples based on the location of a remote terminal and the RF environment, 2) concentrating signal power to the intended user terminal (beam-forming), and 3) placing nulls to user terminals using similar or the same frequency resources, such as terminals using the same channel on the downlink (base station to user terminal), among others. With these strategies, adaptive arrays can greatly enhance the capacity of a wireless system.

Using various SDMA strategies, as described above, a single base station may be able to communicate with more than one user terminal on the same conventional communications channel. The number of user terminals with which a base station can successfully communicate using a single communications channel varies. It can depend on the number of other user terminals on other channels, the nature of physical obstructions to the radio signals, the amount of RF (radio frequency) noise in the environment, and the design of particular radios and the overall system among other factors.

Prior art SDMA systems have generally used one conventional channel for one user terminal, and used the co-channel interference mitigating capabilities provided by SDMA for mitigating interference to co-channel user terminals in other cells. A co-channel user terminal can be viewed as another user terminal using the same conventional channel. For co-channel users communicating with another base station, in a different cell, the reuse frequency of the channel determines how near the co-channel users are. This affects how much co-channel interference is created. SDMA used to increase reuse frequency can increase the capacity of the system by allowing more aggressive frequency reuse.

As an alternative, the SDMA system can assign a predetermined number of user terminals to each channel. For example, three user terminals using SDMA could share each channel. Unfortunately, a system with a predetermined number of user terminals is unlikely to operate at maximum capacity, or to provide optimum quality of service. The number of co-spatial users that can successfully share a channel typically depends on the individual characteristics of each user terminal and its reception on its assigned channel. In most real systems, some user terminals will be able to successfully share a channel with more co-spatial users than others.

Therefore, using a predetermined number for co-spatial terminals will likely result in some channels being overused and some being underused. Underused channels waste capacity, and overused channels may have an unacceptably low quality of service. In order to ensure high quality service on all channels, some channels will be underused. This reduces the capacity benefits that an SDMA system can offer.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

A communications channel can be assigned to a user terminal by first determining a spatial strategy, such as a co-spatial constraint for the user terminal. Alternatively, user terminals can be assigned to a communications channel by comparing a co-spatial constraint assigned to the user terminal to those assigned to the available channels. Terminals with similar constraints can be grouped on the same channel. Such an approach can be used to optimize system capacity.

The capacity of a wireless communications network can be increased by allowing different radio communications channels to support different numbers of co-spatial users. The number of co-spatial terminals for each conventional channel can be determined based on the capacity of each terminal to be co-spatial with other terminals in the existing radio frequency (RF) environment, among other things. Any of a number of different quality parameters, such as distance from the base station, can be determined for each terminal. A spatial strategy can then be formulated for each terminal based on the measured parameter. Terminals with similar spatial strategies can be assigned to the same channel.

Assigning a Terminal to a Conventional Channel

Figure 1:
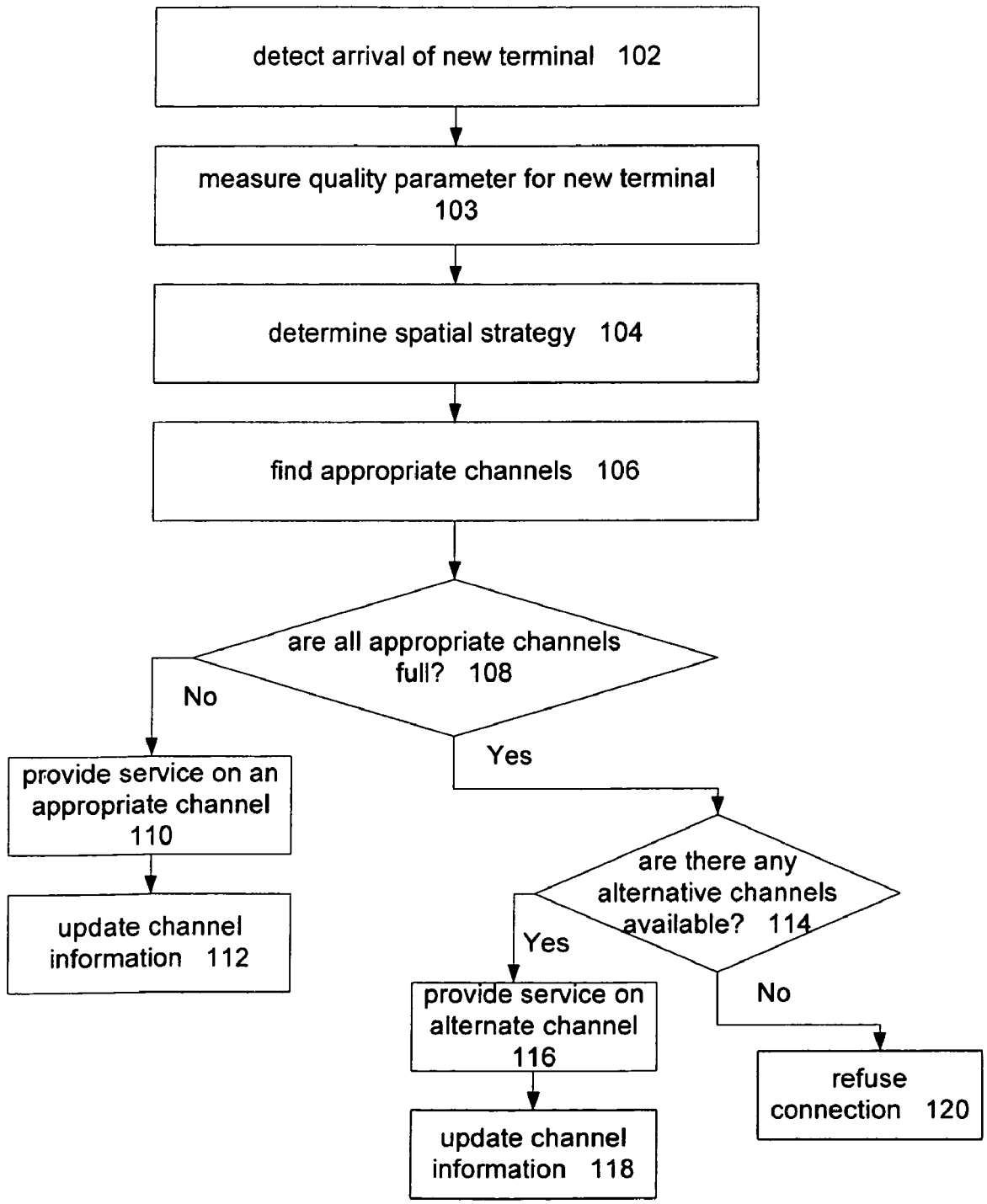
FIG. 1 is a flow chart of a process for assigning a channel to a user terminal implemented in accordance with an embodiment of the invention.

Referring to FIG. 1, the base station detects the arrival of a new user terminal 102. This may occur when the base station receives a signal from the new terminal. This signal will generally be some form of access request caused by a handoff or a new connection, such as a configuration request burst, a channel assignment request, or an answer to a page. Alternatively, the base station can already have a connection with the new terminal, but changes in the RF environment, or other factors, may indicate that a channel reassignment is helpful or otherwise desirable.

Using a received signal, the base station can determine a spatial strategy for the new terminal 104. The spatial strategy can include a constraint on co-spatial users, null-placing, beam-forming, various diversity transmission schemes, space-time coding, and other techniques. This may be done, for example, by measuring a quality of the received signal or by receiving a quality measurement in the signal made by the remote 103. One such parameter is the signal strength of the received signal. A spatial strategy, such as a co-spatial constraint, can then be determined from the measurement. Alternatively, the new terminal may measure the strength of a signal it receives from the base station. That signal can be a standard signal broadcast to all terminals, such as a broadcast channel (BCCH) signal or a signal from a special measurement protocol. The signal received from a new remote at the base station may already have the quality parameter included or it can be determined later. Various other measurements, such as the signal to noise ratio (SNR), the signal to interference ratio (SIR), the distance of the second radio from the first radio, the signal to interference and noise ratio (SINR), some quality of service (QoS) designation of the second radio, some mobility designation (e.g., mobile/fixed or fast/slow terminal) of the second radio, the actual mobility of the second radio, the Doppler shift of the received signal, the Doppler spread of the received signal, the velocity of the second radio, the angle spread (statistics based on the angles of arrival) of the received signal, and numerous other metrics and parameters known in the art may also be used in determining the co-spatial constraint of the new terminal.

The co-spatial constraint or other spatial strategy can depend on the mobility of the new terminal. If the new terminal is a mobile unit traveling at a fast rate, for example a cell phone in a car, the new terminal will likely be given more severe constraints on the number of co-spatial terminals than stationary or slow-moving terminals. The base station may measure the speed of the new terminal using a variety of techniques, including triangulation or Doppler shift. Then, the base station can calculate a co-spatial constraint for the new terminal based on this measurement.

The co-spatial constraint or other spatial strategy can also be determined based on the distance of the new terminal from the base station. If the new terminal is a mobile unit this distance can vary on arrival at the base station, and even during the connection. the base station can measure the distance to the new terminal using triangulation, signal delay, or some other method. The base station can then determine a co-spatial constraint for the new terminal based on this measured parameter. Since the base station may use a lower power level to communicate with nearby terminals than for communications with terminals relatively farther away, assigning these terminals co-spatial constraints that tend to group them on the same channel can have additional benefits.

Spatial strategies can also be determined completely or partially using information from the user terminal. The user terminal can listen to and measure existing traffic on the network and determine it own quality parameters. It can even include a co-spatial constraint determination in a message sent to the base station. Alternatively, the new terminal may use a signal transmitted to the base station to inform the base station of the new terminal's subscription level. For example, a user could pay extra for a quality of service level that guarantees that it will share a channel with no more than a maximum of two terminals. The signal transmitted by the new terminal to the base station may also have information about the capacity of the hardware of the terminal to handle spatial processing.

As with any other spatial strategy, the co-spatial constraint, i.e., the number of additional users with which the terminal can share a channel for communications with the same base station, can be determined in a variety of ways using a variety of parameters and metrics. Any number of parameters can be combined for the determinations. Some of the parameters may also overlap. For example, in a system using the distance metric, the distance may be estimated using a signal strength metric.

Once a co-spatial constraint of the new terminal has been determined, the base station finds an appropriate channel 106 on which to exchange communications with the terminal. In one embodiment, the base station finds channels that are used for communications with user terminals with the same co-spatial constraint as the new terminal. As an example, consider a determination that a new terminal seeking network access is able to share a channel with three other user terminals. This can be called a co-spatial constraint of four. To add the new terminal, the base station searches for a channel with a constraint of four or less. If any such channels are found, the base station determines whether they are full 108. A channel is full if it is already in use by the base station to communicate with the maximum number of terminals allowed by the co-spatial constraints. In the example, if the base station finds a channel with constraint four, already in use by four terminals, then that channel is full. The channel is full because the addition of even one additional terminal will result in each preexisting terminal on the channel sharing the channel with four other terminals. Sharing with four other terminals is beyond the constraints of the terminals in this example.

If one of the appropriate channels found by the base station is not full, for example it is in use by three or fewer terminals all having a constraint of four, then the base station can assign the new terminal to that channel 110. To do this, the base station uses SDMA to create another spatial channel on the conventional channel assigned to the new terminal. The base station then updates its records 112, in this particular example to show this channel as now being full.

However, if all of the appropriate channels are full, the base station can find a less efficient alternative channel that is not full 114. If an available alternative channel cannot be found, the connection requested by the new terminal will be refused 120. If, on the other hand, there is an alternative channel that can accommodate the new terminal that channel can be used for communications with the new terminal 116. Then, the information related to this channel is updated to show the creation of a new spatial channel for the new terminal on the alternative conventional channel 118.

A variety of different channel allocation methods can be applied to the present invention. Users can be packed into as few channels as possible, so each channel is used at maximum capacity. Alternatively, the base station may first assign all channels accessible to it, i.e., allocated to it, to one user terminal each. This minimizes the usage of each channel. Then, after all channels are assigned when a new terminal arrives, a channel already in use can be shared to accommodate the new terminal.

Alternative channels may be assigned in various different ways. In one embodiment, if there are channels not in use at the time the new terminal arrives, then the new terminal can be assigned to one of those channels. This assignment will characterize the future use of the channel. According to the invention, the co-spatial constraint of the new terminal assigned to the previously empty conventional channel will limit the number of other terminals that can use the same channel. This is because the channel should now be used to service terminals with the same co-spatial constraint as the new terminal, if possible.

In another embodiment, the base station can assign the new terminal to a channel that is neither empty nor full, but also not the most efficient. One such channel is a channel with a higher co-spatial constraint than the new user. If the new user shares a channel with users that have a higher co-spatial constraint, then all the users on that channel must operate at the lowest co-spatial constraint level on the channel. While this can theoretically limit capacity, it does allow access to users that might otherwise be denied. Consider, as an example, an alternative channel that has three user terminals sharing it, each user terminal having a co-spatial constraint of five. This channel is not full, since it can accommodate two more terminals with the same co-spatial constraint as the terminals already using it. However, it is also not the best channel, because the new terminal has a co-spatial constraint of four. Thus, if the new terminal is assigned to this channel, then the channel becomes full. The system has accommodated one additional user terminal, when the channel could have supported two additional user terminals. This may be less than the optimal capacity, but two additional users capable of supporting a constraint of five were not seeking access to the network.

The channel preferences may be selected using various priority classifications. For example, the conditions under which an empty channel is preferred over a less than ideal channel can be selected to suit the circumstances of any particular implementation. Similarly, limits can be placed on assignments to an alternative channel. It may be required that the co-spatial constraints of terminals sharing a channel always be the same. Alternatively, ranges may be selected. The system can also have either a dynamic or a static channel allocation scheme. That is, the number of terminals each channel can support can depend on the terminals already on the channel. Alternatively, a channel can be classified as supporting a certain number of terminals independent of the terminals using the channel. Other particular aspects of the network configuration can be set as appropriate to the particular network and expected user traffic.

In the examples above, the allocation scheme is dynamic. In other words, the same conventional channel sometimes supports communications with two terminals, at other times with five, and so on. However, a static channel characterization scheme can be used. In one such static scheme, each channel has a predetermined maximum number of terminals that it will support. For example, the channels allocated to the base station can be divided up into co-spatial classes. If channels one through ten are available to the base station, then channels one to three can be designated as "one-terminal" channels (co-spatial constraint one). A "one-terminal" channel can only service one user terminal at a time. Similarly, channels four to eight and seven to ten can be designated two- and three-terminal channels respectively (co-spatial constraint values of two and three, respectively).

Figure 2:
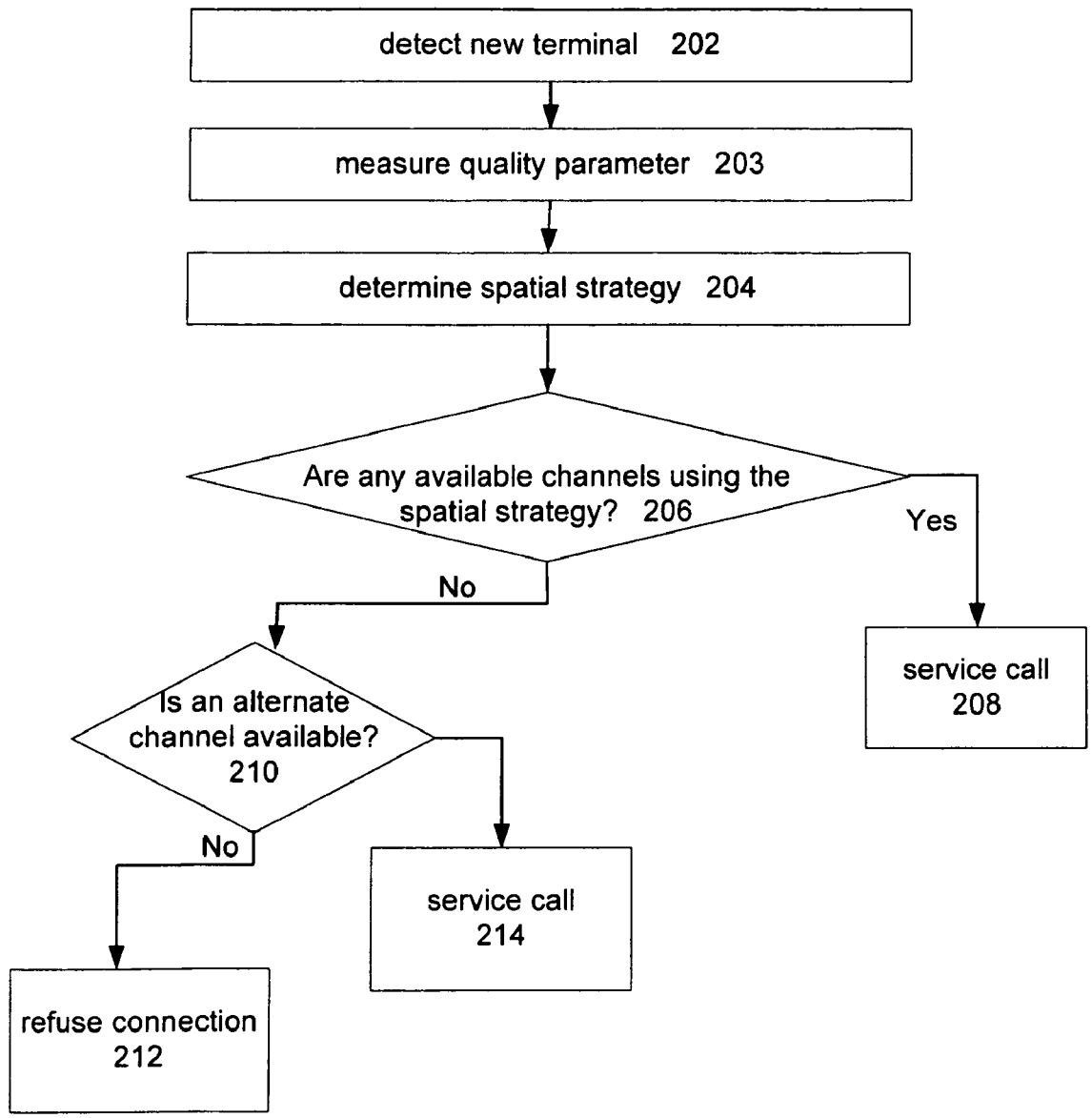
FIG. 2 is a flow chart of a process for assigning a channel using static channels assignment in accordance with an embodiment of the present invention.

Referring to FIG. 2, another embodiment of the invention using a static channel assignment scheme is presented. In FIG. 2, the base station detects the arrival of a new terminal 202, the quality parameter is measured 203 and a spatial strategy for the new terminal is determined 204. This can be done in a manner similar to that described with reference to FIG. 1.

In FIG. 2, a search is made for available channels with the same co-spatial constraint as that determined for the new terminal 206. For example, if the new terminal is to have a co-spatial constraint of two, then the new terminal is assigned to one of the constraint two channels 208. In the above example, one of channels four to eight will be assigned if space is available.

If all channels with the desired co-spatial constraint are full, then the base station may either refuse service 212, or look for a less efficient alternate channel 210. For example, if a constraint one channel (one of channels one to three) is available, the new terminal may be assigned to that channel 210 and serviced 214 rather than be refused service. Because only one terminal can use that channel in any event, this may be considered a reasonable network configuration trade. Further considerations can be added to the static allocation method that may allocate channels differently in different scenarios. The process flow of FIG. 2 is a more specific example of implementing FIG. 1.

In the example of either FIG. 1 or 2, channel allocation is not limited to the arrival of a new terminal at a base station, but can also happen during a connection or session. For example, during communication with the base station, a user terminal may experience a degradation or improvement to its reception. This may allow the co-spatial constraint of that terminal to be changed. If this occurs, the terminal can be assigned or handed over to a different channel based on this change without interrupting the connection or session. Such in-session channel reassignment can be used to improve the capacity of the base station, and the network. The co-spatial constraints of each terminal may be reevaluated periodically to facilitate channel reassignment. Alternately, each terminal can alert the base station when a change in its co-spatial constraint may be appropriate.

Demonstrative Example

The process flow described above in connection with FIGS. 1 and 2 is further demonstrated by way of example to ease understanding of the invention. The following example described with reference to FIG. 3 demonstrates how certain embodiments of the invention may be carried out. The example is simplified for ease of understanding and in order not to obscure the invention.

Figure 3:
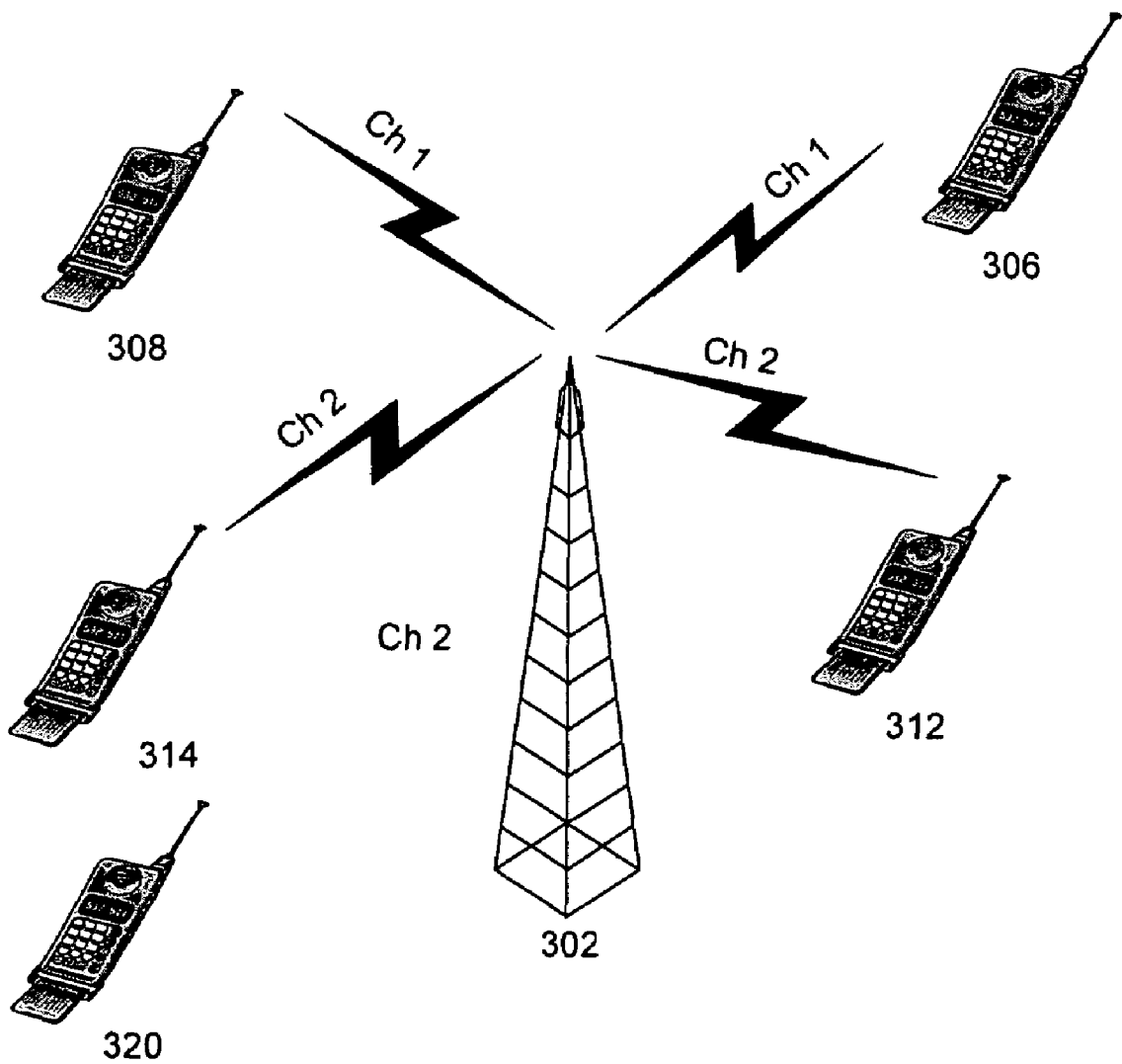
FIG. 3 is a diagram of a base station in communication with user terminals over two channels using co-spatial constraints.

FIG. 3 shows a base station 302 of a wireless communications system communicating with four user terminals using two communications channels. The base station 302 uses channel one (Ch1) to communicate with user terminal 306 and user terminal 308, and channel two (Ch2) to communicate with user terminal 312 and user terminal 314. The base station 302 uses an SDMA scheme and a spatial strategy to allow more than one user terminal to share each channel.

In FIG. 3, the base station 302 assigned a "one-other" co-spatial constraint (constraint of two) to the user terminals 306 and 308. Since the two user terminals 306 and 308 share Ch1, no other user terminals communicating with the base station 302 can use this channel. Ch 1 is full. However, the channel may be reused elsewhere in the network by a co-channel interferer at another base station.

On the other hand, user terminals 312 and 314, for example, are determined to be able to be co-spatial with two other user terminals each. That is, they have a "two-other" co-spatial constraint (constraint of three). Accordingly, one additional user terminal may use Ch2 for communicating with the base station 302, provided the additional terminal can be co-spatial with at least two other terminals. In other words, the additional terminal should be assigned a constraint as restrictive or less restrictive than the constraints of the other terminals 312 and 314. For example, a constraint four is less restrictive than a constraint three.

If a new user terminal 320 requests channel allocation, for example as a result of a hand-off or hand-over request, a channel must be selected in order to accept the new user terminal 320. In one embodiment, the base station 302 determines the user terminal 320's co-spatial constraint. This determination may be performed according to any of the methods described with reference to FIGS. 1 and 2.

The base station 302 may determine that user terminal 320 should be co-spatial with only one other user (constraint of two). As shown in FIG. 3, there is no channel that user terminal 320 can use to communicate with the base station 302 so service is denied. First, Ch1 is full. Second, the new user terminal's co-spatial constraint of two eliminates channel Ch2 as an option. This is because user terminal 320 should not share a channel with more than one other user terminal, and Ch2 is already in use by two terminals. The new user terminal 320 is then rejected service under the circumstances of FIG. 3 if it has a constraint of two. At another time, if one of the user terminals sharing Ch 2 terminates its connection, then user terminal 320 may be serviced on Ch2. However, this does not result in optimum capacity, because the remaining terminal would be sharing Ch 2 with only one user terminal, when it is able to share with two terminals. If, on the other hand, user terminal 320 is determined to be able to share a channel with two or more other user terminals, then Ch2 can accommodate user terminal 320 under the circumstances of FIG. 3.

While in an actual base station, there would likely be more than two channels, in this example it is assumed that Ch1 and Ch2 are the only available channels. The relatively large number of available channels in an actual wireless system mitigates these allocation concerns. With more channels and user terminals, more ways can be found to place user terminals with similar co-spatial constraints on the same channel. In certain embodiments, sophisticated channel-searching methods may be used to increase system capacity even more. Also, periodic channel reassignments can be forced to ensure efficient distribution of the base station's frequency resources by rebalancing the channel loads.

Other Spatial Strategies

Mobile radio communications systems, such as cellular voice and data radio systems, typically have several base stations in different locations available for use by mobile or fixed user terminals, such as cellular telephones or wireless web devices. Each base station typically is assigned a set of frequencies or communications channels to use for communications with the user terminals. These frequencies may be different from those of neighboring base stations in order to avoid interference between neighboring base stations. This assignment scheme is a part of the frequency reuse plan of the wireless network. As a result, the user terminals can more easily distinguish the transmissions received from one base station from the signals received from another. Alternatively, all base stations may use all of the available frequencies at all times, along with other signal differentiation techniques, such as spatial division. The nearness of a base station using the same frequency resource depends on the frequency reuse plan of the system.

Each base station is assigned a set of frequency resources which are organized into conventional channels. In a typical wireless network, a conventional channel can consist of a time slot pair in a TDMA frame on a carrier frequency. A TDMA (Time Division Multiple Access) frame may contain, for example, eight downlink transmit time slots followed by eight uplink receive time slots. Alternatively, the downlink time slot may be on a different carrier frequency than the uplink time slot. A carrier frequency may be a 200 kHz band around a central frequency, such as 800 MHz or 1.9 GHz. This band represents a frequency resource used by the base station and its user terminals for communication. Thus, a base station transmits to a given user terminal, for example, on the second transmit and receive time slots on this frequency in a given frame. Furthermore, the communications channel may be organized using common techniques, such as FDD (Frequency Division Duplex), TDD (Time Division Duplex), FDMA (Frequency Division Multiple Access), and CDMA (Code Division Multiple Access).

Other user terminals may also be using this same conventional channel. The conventional channel may be reused at a nearby base station, used by two or more terminals communicating with the same base station using SDMA, or both. Those user terminals sharing one conventional channel to communicate with the same base station are termed co-spatial user terminals in SDMA, because the base station uses spatial strategies to distinguish these terminals. The user terminals using the same conventional channel to communicate with other base stations as a result of channel reuse, are termed co-channel users or co-channel interferers.

Figure 4:
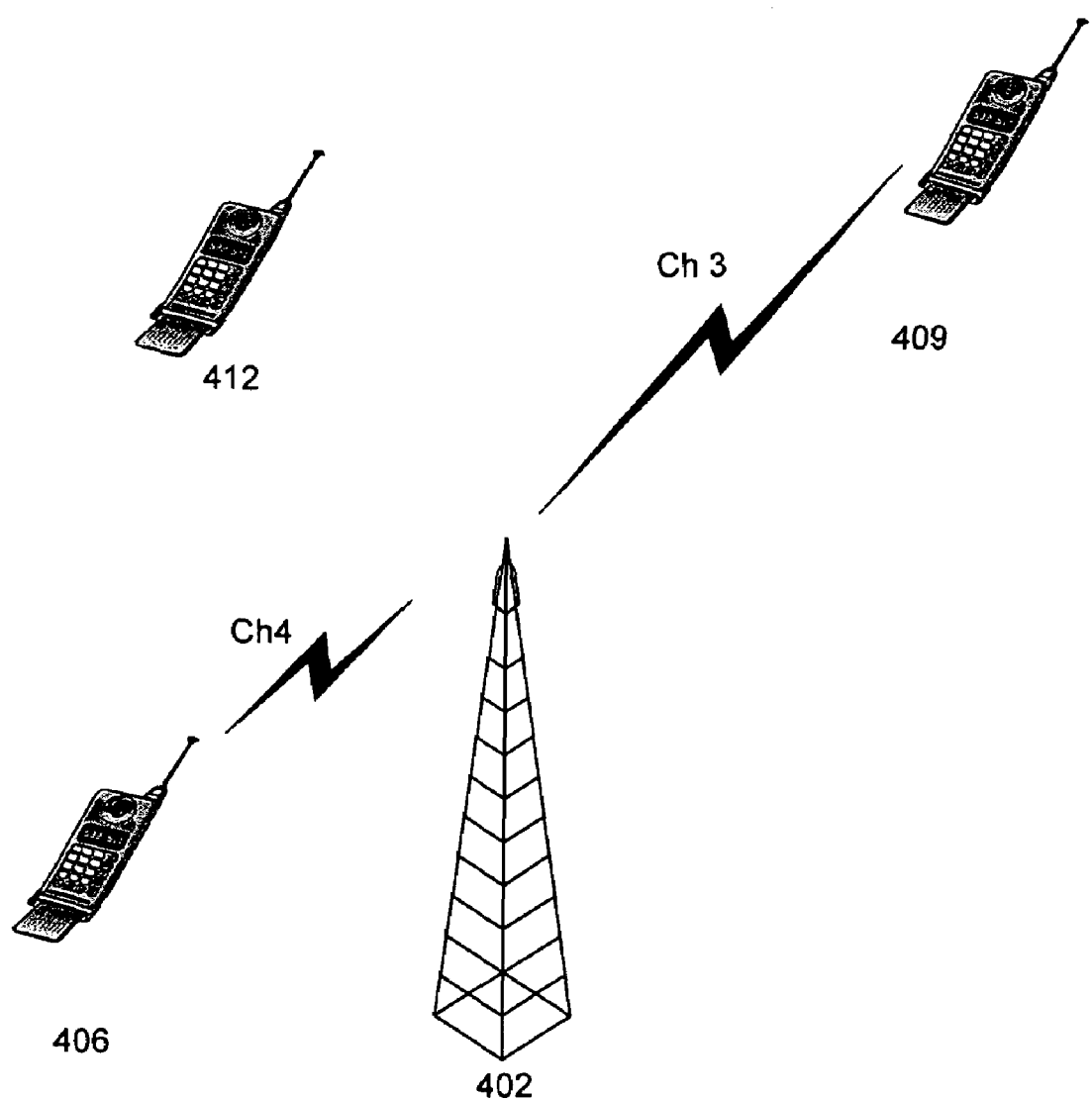
FIG. 4 is a diagram of a base station in communication with user terminals over two channels using other spatial strategies.

FIG. 4 can be used to show an application of the invention to other spatial strategies including power control. In FIG. 4, for simplicity and ease of understanding, assume that the most restrictive co-spatial constraint a user terminal can have is a "one-other" constraint in this embodiment. In other words, some channels can serve one terminal at a time, while other channels can serve two terminals at a time.

FIG. 4 shows a base station 402 communicating with terminals 404 and 406 using channels three (Ch3) and four (Ch4), respectively. The base station may also be using other channels to communicate with numerous other terminals (not shown). In one embodiment, the base station 402 is periodically monitoring the distance between each terminal 404 and 406 and the base station 402. The distance may be inferred from signal strength, SNR, or other signal quality parameters including those mentioned above.

If the base station 402 determines that the new terminal 412 is too far from the base station to share a channel with another user, then the new terminal 412 is assigned its own channel. However, if the base station 402 determines that the new terminal 412 can share a channel, then the base station 402 checks if there are other terminals communicating with the base station 402 that can share a channel and are not currently doing so. In FIG. 4, terminal 406 may be such a terminal. In this case, Ch4 will be divided into two spatial channels.

When two terminals share Ch4 according to a spatial strategy, it may be desirable for the base station 402 to a direct a null to new terminal 412 associated with a signal beam aimed at terminal 406. More precisely, the base station sends signals on Ch4 that interfere in the existing RF environment in such a way that terminal 412 experiences mitigated interference due to the co-spatial user 406. However, these signals may cause undue interference to adjoining cells if they are transmitted above a certain threshold level of power. Terminal 409 may be too far from the base station 402 to be co-spatial with other terminals, because the power level on Ch3 is too high. If this is the case, the nulls that the base station 402 is able to place when transmitting signals on Ch3 should be used to mitigate interference to co-channel interferers. Co-channel interferers can be thought of as terminals in other cells using the same conventional channel. This may help implement a more aggressive channel reuse scheme in the communications system.

Beam-forming and null-placing are sometimes described directionally, for example, as placing a null in the direction of a user terminal. However, null-placing can involve using multiple waveforms in such a way that they destructively interfere at certain spatial locations due to the RF environment. Furthermore, nulling or null-placing may not eliminate all interference experienced by other users. Null-placing may only reduce interference based on information about the RF environment and the RF characteristics or parameters of other user terminals.

If transmissions on a channel occur at a power at a level below the threshold, the interference caused at nearby cells may not be severe. This threshold can be set so that signals transmitted at power levels below the threshold do not unduly interfere with communications occurring in nearby cells on the same or interfering channels. In this case, a spatial strategy can be used to split the conventional channel into two spatial channels. Referring back to FIG. 1, the base station can use the obtained quality metric 103 to approximate a power level that should be used to communicate with the new terminal. This power level can become a part of the spatial strategy determined for that user 104. Furthermore, this power level can become a constraint on subsequent terminals using the channel. This can create a "low-power channel", i.e., a channel supporting terminals transmitting signals and receiving signals transmitted at a sufficiently low level of power. A low-power channel supporting only one terminal can be a good choice for co-spatial sharing. A spatial strategy can be used that focuses the power of the signals transmitted by the base station to the new terminal, and mitigates the interference caused by those signals to the old terminal. For example, when transmitting a signal to the new terminal, the base station can form a beam in the direction of the new terminal and place a null in the direction of the old terminal using conventional beam forming and nulling technology.

If a power level above the threshold is used, then the base station can assign an unused channel to the new terminal. The spatial strategy may still focus the power of the signals transmitted to the new terminal, and mitigate the interference caused by these high power signals to nearby cells. In other words, the base station forms a beam in the direction of the new terminal, and places nulls to nearby terminals and base stations reusing the same channel.

Base Station Structure

Figure 5:
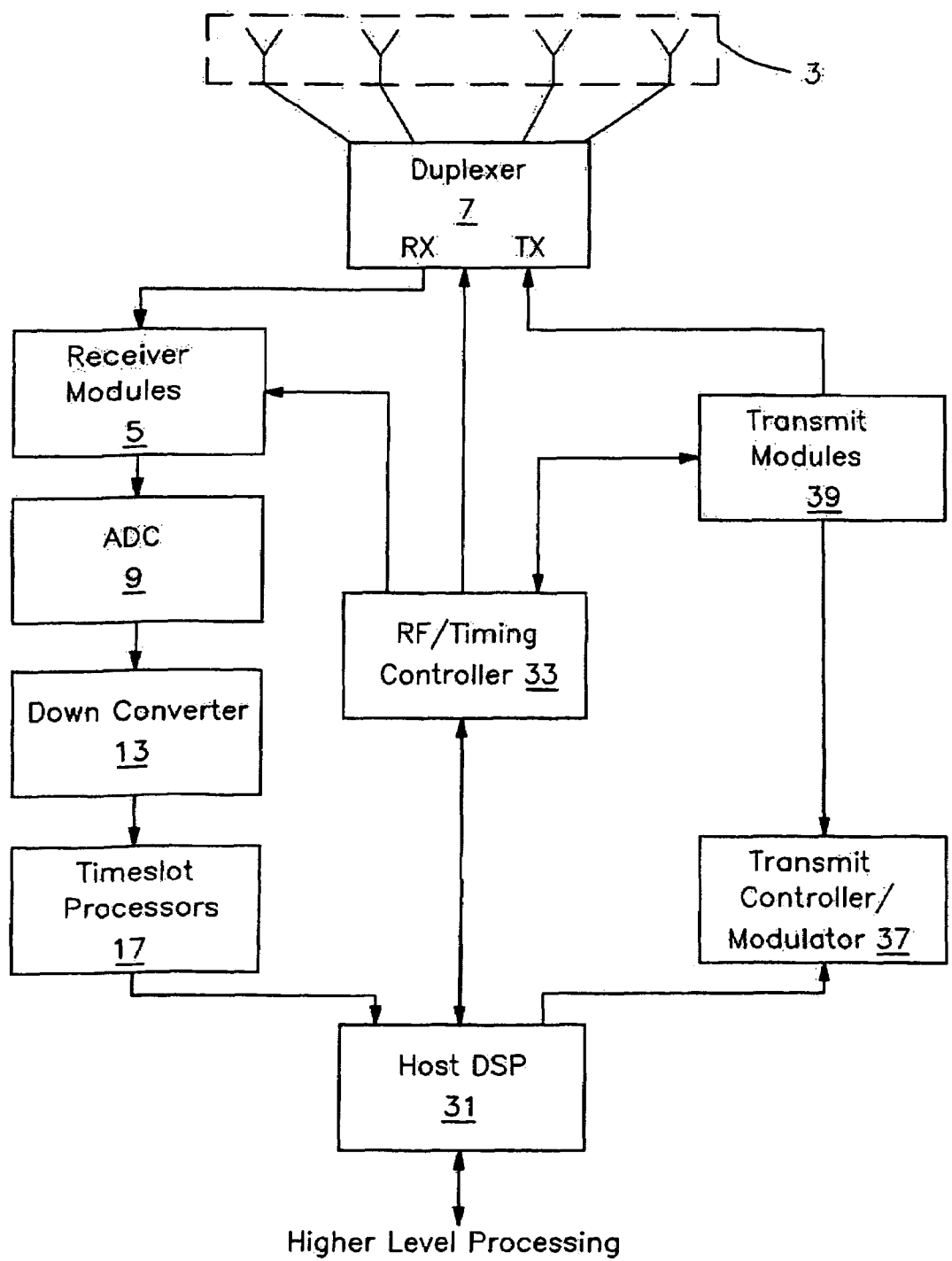
FIG. 5 is a simplified block diagram of a base station on which an embodiment of the invention can be implemented.

The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD). FIG. 5 shows an example of a base station of a wireless communications system or network suitable for implementing the present invention. The system or network includes a number of subscriber stations, also referred to as remote terminals or user terminals, such as that shown in FIG. 5. The base station may be connected to a wide area network (WAN) through its host DSP 31 for providing any required data services and connections external to the immediate wireless system. To support spatial diversity, a plurality of antennas 3 is used, for example four antennas, although other numbers of antennas may be selected.

A set of spatial multiplexing weights for each subscriber station are applied to the respective modulated signals to produce spatially multiplexed signals to be transmitted by the bank of four antennas. The host DSP 31 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. Suitable smart antenna technologies for achieving such a spatially directed beam are described, for example, in U.S. Pat. No. 5,828,658, issued Oct. 27, 1998 to Ottersten et al. and U.S. Pat. No. 5,642,353, issued Jun. 24, 1997 to Roy, III et al. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 7, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 5, and are converted down in analog by RF receiver ("RX") modules 5 from the carrier frequency to an FM intermediate frequency ("IF"). This signal then is digitized (sampled) by analog to digital converters ("ADCs") 9. Final down-converting to baseband is carried out digitally. Digital filters can be used to implement the down-converting and the digital filtering, the latter using finite impulse response (FIR) filtering techniques. This is shown as block 13. The invention can be adapted to suit a wide variety of RF and IF carrier frequencies and bands.

There are, in the present example, eight down-converted outputs from each antenna's digital filter 13, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 17 (hereinafter "timeslot processor") for further processing, including calibration, according to one aspect of this invention. Eight Motorola DSP56300 Family DSPs can be used as timeslot processors, one per receive timeslot. The timeslot processors 17 monitor the received signal power and estimate the frequency offset and time alignment. They also determine smart antenna weights for each antenna element. These are used in the SDMA scheme to determine a signal from a particular remote user and to demodulate the determined signal.

The output of the timeslot processors 17 is demodulated burst data for each of the eight receive timeslots. This data is sent to the host DSP processor 31 whose main function is to control all elements of the system and interface with the higher level processing, which is the processing which deals with what signals are required for communications in all the different control and service communication channels defined in the system's communication protocol. The host DSP 31 can be a Motorola DSP56300 Family DSP. In addition, timeslot processors send the determined receive weights for each user terminal to the host DSP 31. The host DSP 31 maintains state and timing information, receives uplink burst data from the timeslot processors 17, and programs the timeslot processors 17. In addition it decrypts, descrambles, checks error correcting code, and deconstructs bursts of the uplink signals, then formats the uplink signals to be sent for higher level processing in other parts of the base station. Furthermore DSP 31 may include a memory element to store data, instructions, or hopping functions or sequences. Alternatively, the base station may have a separate memory element or have access to an auxiliary memory element. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 37. The host DSP also manages programming of other components of the base station including the transmit controller/modulator 37 and the RF timing controller shown as 33.

The RF timing controller 33 interfaces with the RF system, shown as block 45 and also produces a number of timing signals that are used by both the RF system and the modem. The RF controller 33 reads and transmits power monitoring and control values, controls the duplexer 7 and receives timing parameters and other settings for each burst from the host DSP 31.

The transmit controller/modulator 37, receives transmit data from the host DSP 31. The transmit controller uses this data to produce analog IF outputs which are sent to the RF transmitter (TX) modules 35. Specifically, the received data bits are converted into a complex modulated signal, up-converted to an IF frequency, sampled, multiplied by transmit weights obtained from host DSP 31, and converted via digital to analog converters ("DACs") which are part of transmit controller/modulator 37 to analog transmit waveforms. The analog waveforms are sent to the transmit modules 35. The transmit modules 35 up-convert the signals to the transmission frequency and amplify the signals. The amplified transmission signal outputs are sent to antennas 3 via the duplexer/time switch 7.

User Terminal Structure

Figure 6:
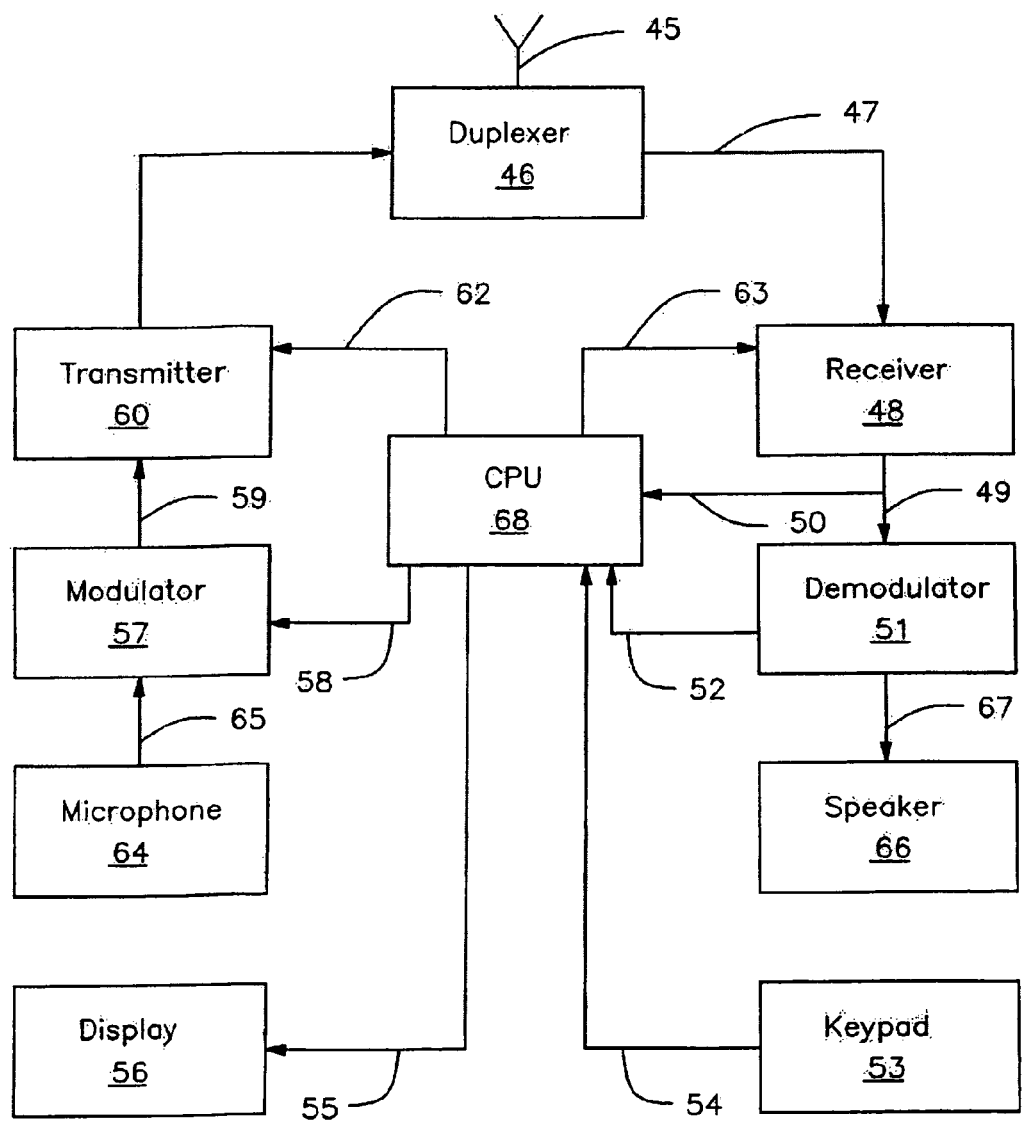
FIG. 6 is a simplified block diagram of a remote terminal on which an embodiment of the invention can be implemented.

FIG. 6 depicts an example component arrangement in a remote terminal that provides data or voice communication. The remote terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 66, respectively for a voice communications remote terminal. In another embodiment, the microphone and speaker are also in direct communication with the CPU to provide voice or data communications. Furthermore remote terminal CPU 68 may also include a memory element to store data, instructions, and hopping functions or sequences. Alternatively, the remote terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 5 and 6, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using spatial processing. These devices may be cellular phones, PDA's, laptop computers, or any other wireless devices. Generally, since both the base stations and the terminals use radio waves, these communications devices of wireless communications networks may be generally referred to as radios.

In portions of the description above, only the base station is described as performing spatial processing using an adaptive antenna array. However, the user terminals can also contain antenna arrays, and can also perform spatial processing both on receiving and transmitting (uplink and downlink) within the scope of the present invention.

Furthermore, in portions of the description above, certain functions performed by a base station could be coordinated across the network, to be performed cooperatively with a number of base stations. For example, in certain embodiments of the present invention, a co-spatial constraint on a channel means that only a certain number of terminals may use the channel to communicate with a base station. However, the same concept could be defined as a limitation on the number of terminals using the same channel in two or more adjoining cells to communicate with different base station. Thus, actions described as taken by one base station may actually be distributed among several base stations in the system.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:
assigning a co-spatial constraint to each of a plurality of conventional traffic communications channels of a base station, the channel co-spatial constraints comprising a limitation on the quantity of radios that can share the respective channel using spatial division multiple access;
receiving a request from a user terminal to communicate using a traffic communication channel of the base station;
measuring a quality parameter of the request received from the user terminal;
deriving a co-spatial constraint for the user terminal based on the quality parameter, the user terminal co-spatial constraint comprising a limitation on the quantity of additional radios with which the user can share a conventional traffic communications channel using spatial division multiple access;
assigning the user terminal co-spatial constraint to the user terminal; and
assigning the user terminal to one of the plurality of traffic communication channels having a channel co-spatial constraint that is no less than the user terminal co-spatial constraint and that has no more assigned radios than permitted by the channel co-spatial constraint.

2. The method of claim 1, wherein the other radios assigned to a channel have the same user terminal co-spatial constraint as the assigned user terminal.

3. The method of claim 1, wherein measuring the quality parameter comprises determining one or more of: a distance to the user terminal;
a strength of the received signal;
a SNR of the received request, a SINR of the received request, a quality of service designation of the user terminal;
a mobility designation of the user terminal;
a mobility of the user terminal; a Doppler shift of the request;
a Doppler spread of the request;
a velocity of the user terminal; and an angle spread of the request.

4. The method of claim 1, further comprising transmitting a communications signal to the user terminal over the communications channel.

5. The method of claim 1, further comprising transmitting nulls to the user terminal corresponding to the other radios assigned to the same channel.

6. The method of claim 1, further comprising:
searching for a channel having a channel co-spatial constraint equal to the user terminal co-spatial constraint and having a number of assigned radios no more than the channel co-spatial constraint;
if a such a channel is not found, then searching for a channel having a channel co-spatial constraint that is less than the user terminal co-spatial constraint and having a number of assigned radios no more than the channel co-spatial constraint;
if such a channel is not found, then denying service to the user terminal; and
wherein assigning the user terminal comprises assigning the user terminal to the channel found by searching.

7. The method of claim 6, further comprising:
reassigning other radios to other channels;
after reassigning other radios, repeating searching for a channel having a co-spatial constraint equal to the user terminal co-spatial constraint and having no more assigned radios than permitted by the channel co-spatial constraint; and
assigning the user terminal to the found channel.

8. The method of claim 1, further comprising assigning a different channel co-spatial constraint to a channel having no more assigned radios than permitted by the user terminal co-spatial constraint and assigning the user terminal to the respective channel if no channel is available having a channel co-spatial constraint that is no less than the user terminal co-spatial constraint and that has no more assigned radios than permitted by the channel co-spatial constraint.

9. A machine-readable medium having stored thereon data representing instructions, which if executed by the machine, cause the machine to perform operations comprising:

assigning a co-spatial constraint to each of a plurality of conventional traffic communications channels of a base station, the channel co-spatial constraints comprising a limitation on the quantity of radios that can share the respective channel using spatial division multiple access;

receiving a request from a user terminal to communicate using a traffic communication channel of the base station;

measuring a quality parameter of the request received from the user terminal;

deriving a co-spatial constraint for the user terminal based on the quality parameter, the user terminal co-spatial constraint comprising a limitation on the quantity of additional radios with which the user can share a conventional traffic communications channel using spatial division multiple access;

assigning the user terminal co-spatial constraint to the user terminal; and assigning the user terminal to one of the plurality of traffic communication channels having a channel co-spatial constraint that is no less than the user terminal co-spatial constraint and that has no more assigned radios than permitted by the channel co-spatial constraint.

10. The medium of claim 9, wherein the instructions further cause the machine to transmit nulls to the user terminal corresponding to the other radios assigned to the same channel.

11. The medium of claim 9, wherein the instructions further cause the machine to perform further operations comprising:

searching for a channel having a channel co-spatial constraint equal to the user terminal co-spatial constraint and having a number of assigned radios no more than the channel co-spatial constraint;

if a such a channel is not found, then searching for a channel having a channel co-spatial constraint that is less than the user terminal co-spatial constraint and having a number of assigned radios no more than the channel co-spatial constraint;

if such a channel is not found, then denying service to the user terminal; and wherein assigning the user terminal comprises assigning the user terminal to the channel found by searching.

12. A communications device comprising:

a receiver to receive a request from a user terminal to communicate using a traffic communication channel of a base station; and a processor communicatively coupled to the receiver to:

assign a co-spatial constraint to each of a plurality of conventional traffic communications channels of the base station, the channel co-spatial constraints comprising a limitation on the quantity of radios that can share the respective channel using spatial division multiple access;

measure a quality parameter of the request received from the user terminal;

derive a co-spatial constraint for the user terminal based on the quality parameter, the user terminal co-spatial constraint comprising a limitation on the quantity of additional radios with which the user can share a conventional traffic communications channel using spatial division multiple access;

assign the user terminal co-spatial constraint to the user terminal; and assign the user terminal to one of the plurality of traffic communication channels having a channel co-spatial constraint that is no less than the user terminal co-spatial constraint and that has no more assigned radios than permitted by the channel co-spatial constraint.

13. The apparatus of claim 12, further comprising a transmitter to transmit a communications signal to the user terminal over the communications channel.

14. The apparatus of claim 13, wherein the transmitter further transmits nulls to the user terminal corresponding to the other radios assigned to the same channel.

15. A method comprising:

measuring a quality parameter of a signal received from a second radio at a first radio;

deriving a co-spatial constraint for the second radio based on the quality parameter, the co-spatial constraint comprising a limitation on the quantity of additional radios with which the second radio can share one of a plurality of conventional communications channels using spatial division multiple access;

assigning the co-spatial constraint to the second radio;

assigning the second radio to one of a plurality of traffic communication channels by first assigning the second radio to an unused channel, if available, and if not available then by second assigning the second radio to a channel to which only one other radio is already assigned, if available, and if not available then by third assigning the second radio to a channel to which only two other radios are already assigned, if available, wherein the number of other radios already assigned does not exceed the co-spatial constraint; and sharing each traffic communication channel to which more than one radio is assigned using spatial division multiple access.

16. The method of claim 15, wherein the second radio is assigned to a channel to which at least one other radio is assigned and wherein the other assigned radios each have an assigned co-spatial constraint and wherein the co-spatial constraints of the other assigned radios are greater than or equal to that of the second radio.

17. The method of claim 15, further comprising assigning a co-spatial restraint to the channel to which the second radio is assigned based on the co-spatial constraint of the second radio.

18. The method of claim 15, wherein determining the quality parameter of the second radio comprises determining one or more of a distance of the second radio from the first radio, a strength of the received signal, a SNR of the received signal, a SINR of the received signal, a quality of service designation of the second radio, a mobility designation of the second radio, a mobility of the second radio, a Doppler shift of the received signal, a Doppler spread of the received signal, a velocity of the second radio, and an angle spread of the received signal.

19. The method of claim 15, wherein determining the quality parameter, and selecting the communications channel are performed by the first radio, the first radio being comprised of a base station and the second radio being comprised of one of a plurality of subscriber units.

* * * * *